US008638526B2

(12) United States Patent
Shinji et al.

(10) Patent No.: US 8,638,526 B2
(45) Date of Patent: Jan. 28, 2014

(54) ROTATING DEVICE

(75) Inventors: Naoki Shinji, Fujieda (JP); Hirotake Nishino, Fujieda (JP); Akira Muramatsu, Fujieda (JP); Yoshio Kurokawa, Fujieda (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 24 days.

(21) Appl. No.: 13/335,513

(22) Filed: Dec. 22, 2011

(65) Prior Publication Data
US 2012/0176700 A1 Jul. 12, 2012

(30) Foreign Application Priority Data

Jan. 11, 2011 (JP) .................. 2011-003093

(51) Int. Cl.
*G11B 17/02* (2006.01)
*H02K 5/16* (2006.01)

(52) U.S. Cl.
USPC .......................... 360/99.08; 310/90

(58) Field of Classification Search
USPC ......... 360/99.08, 99.04, 98.07; 310/67 R, 90, 310/90.5
See application file for complete search history.

(56) References Cited

U.S. PATENT DOCUMENTS

| | | | | |
|---|---|---|---|---|
| 5,459,361 A * | 10/1995 | Morioka | ..................... | 310/67 R |
| 6,252,322 B1 * | 6/2001 | Kawawada et al. | ............. | 310/90 |
| 6,512,654 B2 * | 1/2003 | Teshima | ..................... | 360/99.08 |
| 6,700,256 B2 * | 3/2004 | Fukutani et al. | ................ | 310/90 |
| 7,005,768 B2 * | 2/2006 | Tamaoka et al. | ................ | 310/90 |
| 7,088,023 B1 * | 8/2006 | Gomyo et al. | .................. | 310/90 |
| 7,866,047 B2 * | 1/2011 | Tamaoka | ................... | 29/898.07 |
| 7,988,810 B2 * | 8/2011 | Tamaoka | ...................... | 156/294 |
| 8,056,210 B2 * | 11/2011 | Gomyo et al. | .................. | 29/596 |
| 8,092,090 B2 * | 1/2012 | Yamamoto et al. | ........... | 384/100 |
| 8,300,353 B2 * | 10/2012 | Tashiro et al. | ............ | 360/97.12 |
| 2010/0181875 A1 * | 7/2010 | Tamaoka et al. | ............. | 310/425 |
| 2010/0328819 A1 * | 12/2010 | Shinji et al. | .................. | 360/244 |
| 2011/0176758 A1 * | 7/2011 | Bito et al. | ..................... | 384/121 |
| 2011/0279925 A1 * | 11/2011 | Watanabe et al. | .......... | 360/99.08 |
| 2012/0176700 A1 * | 7/2012 | Shinji et al. | ................ | 360/97.21 |
| 2012/0182645 A1 * | 7/2012 | Kurokawa et al. | ......... | 360/99.08 |

FOREIGN PATENT DOCUMENTS

JP 2007-198555 A 8/2007

* cited by examiner

*Primary Examiner* — Brian Miller
(74) *Attorney, Agent, or Firm* — Blank Rome LLP

(57) ABSTRACT

In a rotating device, a housing includes a cylindrical outer surface facing an inner surface of a through hole and a guiding surface arranged on the underside of the outer surface, the diameter of the guiding surface being less than the diameter of the outer surface. Glue has an interface in an end space. In at least a part of the end space where the glue does not exist, conductive resin seamlessly is applied from the guiding surface to the inner surface of the through hole. With regard to a portion of the inner surface of the through hole that radially faces the guiding surface, the length, in the axial direction, of the portion that touches the conductive resin is greater than the length, in the axial direction, of the portion that touches the glue.

20 Claims, 10 Drawing Sheets

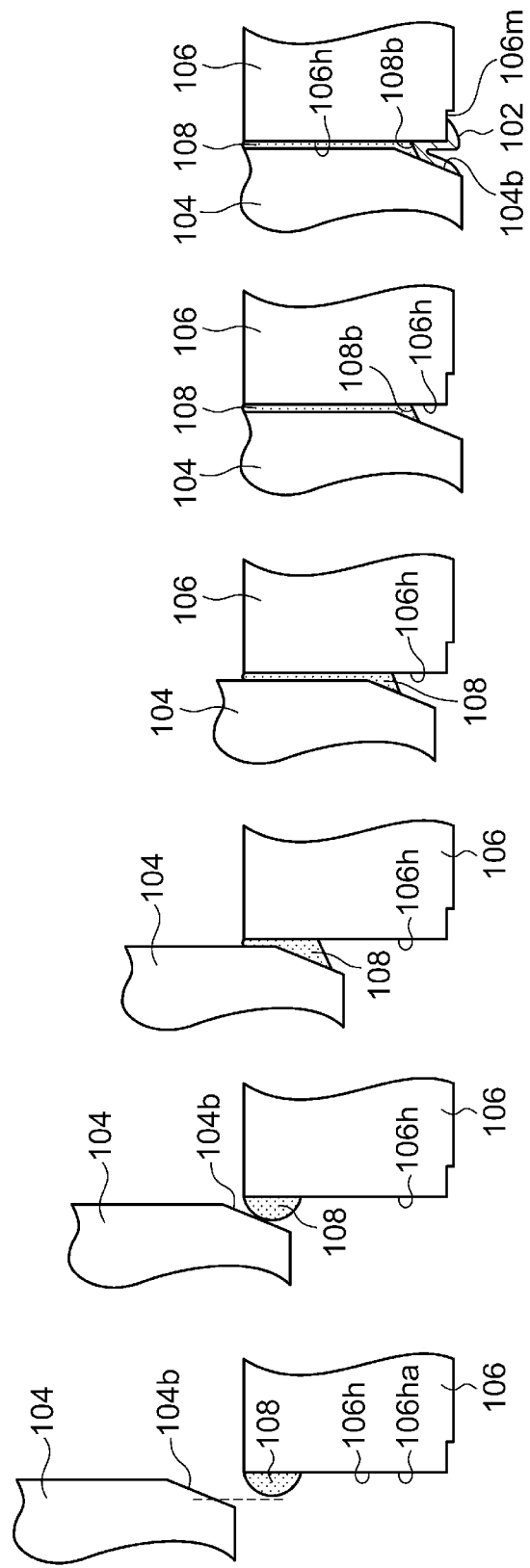

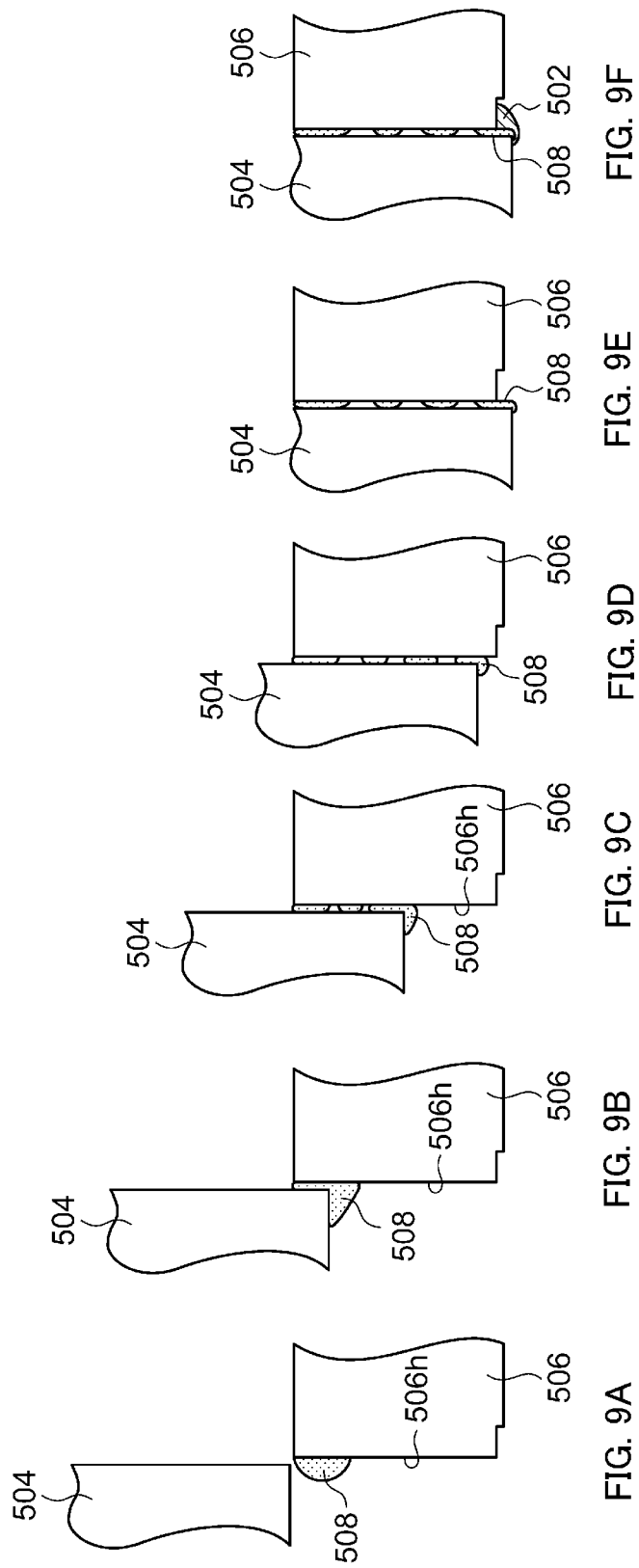

ROTATING DEVICE

CROSS-REFERENCES TO RELATED APPLICATIONS

This application claims priority from Japanese Patent Application No. 2011-003093, filed Jan. 11, 2011.

BACKGROUND OF THE INVENTION

1. Field of the Invention

The present invention relates to a rotating device and a method for manufacturing the same.

2. Description of the Related Art

Disk drive devices, such as hard disk drives, have become miniaturized. The capacity of a disk drive device has also been increased. Such disk drive devices have been installed in various types of electronic devices. In particular, such disk drive devices have been installed in portable electronic devices such as laptop computers or portable music players. In prior arts, a disk drive device described for example in Japanese Patent Application Publication No. 2007-198555 is proposed.

With regard to disk drive devices that are installed in portable electronic devices, their impact resistance has been required to be improved so that the disk drive devices can withstand impacts, such as those due to dropping, compared with the case of stationary electronic devices such as personal computers.

SUMMARY OF THE INVENTION

In a hard disk drive, a magnetic recording disk may be electric-charged due to the rotation of the magnetic recording disk. If this electric-charging causes a discharge between the magnetic recording disk and a read/write head, read/write errors may appear more frequently due to increased discharge-related noise. The magnetic recording disk or the read/write head may also be damaged. One solution to remove static electrical charges accumulated on the magnetic recording disk is to apply conductive resin between a bearing and a base.

Because the conductive resin in general, compared with glue, is easy to peel and brittle, the conductive resin is classified as an impact-sensitive component in the hard disk drive. Therefore, if the conductive resin is used, an impact resistance with regard to the conductive resin should be improved.

Such disadvantage may arise not only in a hard disk drive, but also in other types of rotating device.

The present invention addresses these disadvantages, and a general purpose of one embodiment of the present invention is to provide a rotating device that has good impact resistance.

An embodiment of the present invention relates to a rotating device. The rotating device comprises: a hub on which a recording disk is to be mounted; a bearing unit rotatably supporting the hub; and a base on which a through hole is arranged, the bearing unit being glued to the through hole. The bearing unit includes: a cylindrical outer surface facing an inner surface of the through hole; and a guiding surface arranged on one side of the outer surface opposite to the hub, the diameter of the guiding surface being less than the diameter of the outer surface. Glue, which intervenes between the bearing unit and the through hole, has an interface in an end space, the end space being sandwiched between the guiding surface and the inner surface of the through hole. Conductive resin seamlessly is applied from the base to the bearing unit.

A further embodiment of the present invention relates to a rotating device. The rotating device comprises: a hub on which a recording disk is to be mounted; a bearing unit rotatably supporting the hub; and a base on which a through hole is arranged, the bearing unit being glued to the through hole. The bearing unit includes: a cylindrical outer surface facing an inner surface of the through hole; and a guiding surface arranged on one side of the outer surface opposite to the hub, the diameter of the guiding surface being less than the diameter of the outer surface. A concave portion is arranged on the guiding surface. At least a part of the concave portion is filled with the glue, which intervenes between the bearing unit and the through hole, and the glue expands radially outward beyond a periphery edge, opposite to the hub, of the inner surface of the through hole. Conductive resin seamlessly is applied from the base to the bearing unit.

A further embodiment of the present invention relates to a method for manufacturing the rotating device according to any one of the above-mentioned rotating devices. This method comprises the steps of: applying, in a ring shape, glue on the inner surface of the through hole; inserting the bearing unit into the through hole with the guiding surface of the bearing unit being first inserted; temporarily fixing, in a predetermined manner, the bearing unit to the base by curing the applied ring of glue; seamlessly applying conductive resin from the bearing unit to the base; curing at least the applied conductive resin by heat treatment.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which:

FIG. 8A, FIG. 8B, FIG. 8C, FIG. 8D, FIG. 8E and FIG. 8F are partial section views showing how to mount a hub unit to a base unit;

FIG. 9A, FIG. 9B, FIG. 9C, FIG. 9D, FIG. 9E and FIG. 9F are partial section views showing how to mount a hub unit of the rotating device according to related art to a base unit of the rotating device according to related art.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

According to the investigation made by the present inventors, typical impact applied, in real use, to a hard disk drive mounted on a portable electronic device is less than impact equivalent to application of acceleration of 15000 m/s$^2$ during a time period of 2 ms. Therefore, a hard disk drive, if it maintains a normal operation after application of a test impact acceleration of 15000 m/s$^2$ during a time period of 2 ms, is considered to have sufficient impact resistance in a situation where it is mounted in the portable electronic device and actually is used.

The present inventors repeated impact experimentations using the above-mentioned test impact acceleration, and recognized the following point, with regard to impact resistance of conduction via conductive resin. There are at least two following reasons why the conduction via the conductive resin becomes unstable as a result of application of impact to a hard disk drive:

(1) The conduction is stopped by peeling-off of the conductive resin from a base or a bearing due to impact. That is, contact or adhesion between the conductive resin and the base/the bearing is damaged by the impact.

(2) The conduction is stopped by generation of cracks on the conductive resin due to impact. That is, the conductive resin itself is damaged by the impact.

The present inventors believe that the cracks are caused by the following reason. If impact is applied to the hard disk drive, the bearing vibrates with respect to the base. Stress caused by this vibration is concentrated to a small region in the conductive resin, and shear created in the small region causes the cracks.

Therefore, the present inventors concluded that, in order to improve the impact resistance of the conduction via the conductive resin, one option is to improve the impact resistance of contact between the conductive resin and the base/the bearing and another option is to suppress the generation of the cracks by avoiding the concentration of the stress in the conductive resin and still other option is to perform the both.

A rotating device according to an embodiment of the present invention is preferably used as a disk drive device such as a hard disk drive having a magnetic recording disk. A rotating device according to the first embodiment and a rotating device according to the second embodiment share the structure described in the following with reference to FIGS. 1A, 1B, 2, 3A, 3B.

Common Structure

Figure 1A:
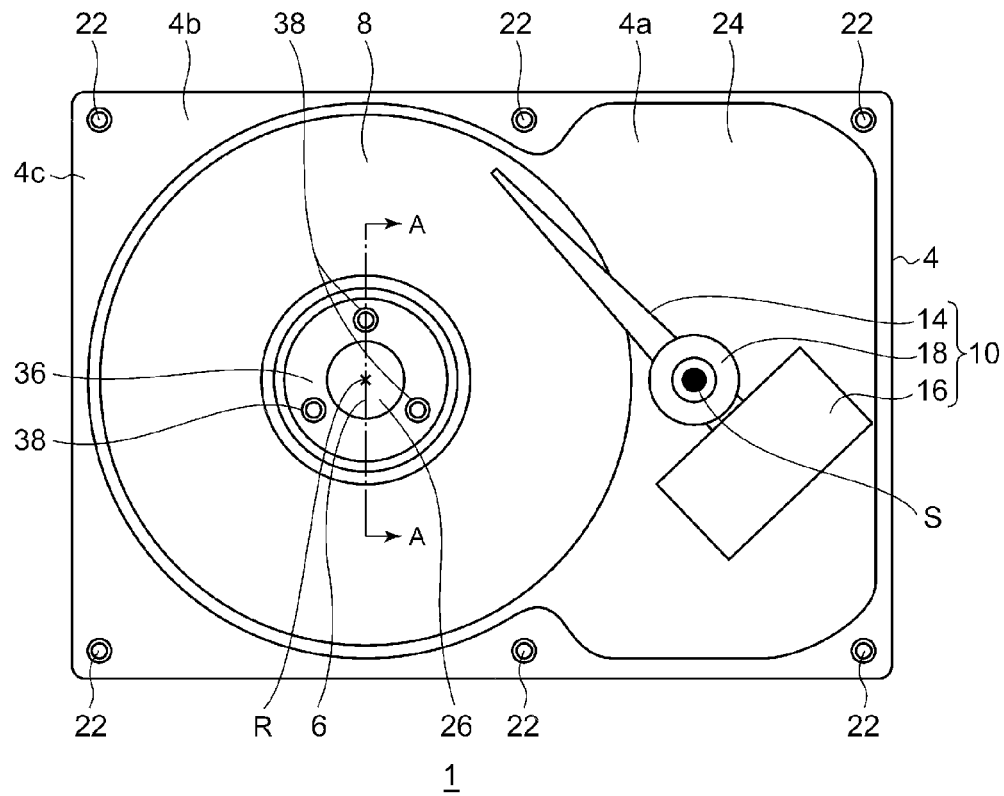
FIG. 1A and FIG. 1B are a top view and a side view of a rotating device, respectively.
Figure 1B:
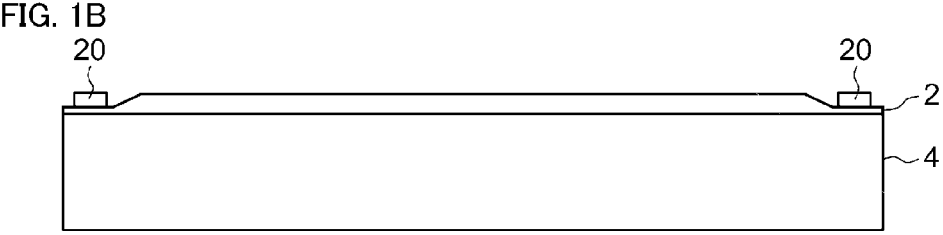

FIG. 1A is a top view of a rotating device 1. FIG. 1B is a side view of the rotating device 1. In FIG. 1A, the rotating device 1 is shown without a top cover 2 in order to show the inside of the rotating device 1. The rotating device 1 comprises: a base 4; a rotor 6; a magnetic recording disk 8; a data read/write unit 10; and the top cover 2.

Hereinafter, it is assumed that the side of the base 4 on which the rotor 6 is installed is the "upper" side.

The magnetic recording disk 8 is a 2.5-inch type magnetic recording disk made of glass with the diameter of 65 mm. The center hole of the magnetic recording disk 8 has a diameter of 20 mm and a thickness of 0.65 mm.

The magnetic recording disk 8 is mounted on the rotor 6, and rotates with the rotor 6. The rotor 6 is rotatably mounted to the base 4 through the bearing unit 12, which is not shown in FIG. 1A.

The base 4 is produced by the following steps of: die-casting an alloy of aluminum to obtain a desired form; coating the surface of the die-casted object with epoxy resin; and after the coating, removing a portion of the coating by cutting in order, for example, to form a after-mentioned cutting portion 106m. As a result, the base 4 as a whole is covered by an insulation layer while a portion of the base 4, which is a metallic surface, is exposed in order to ensure the electrical conduction between the base 4 and other component(s).

The base 4 includes: a bottom plate 4a forming the bottom portion of the rotating device 1; and an outer circumference wall 4b formed along the outer circumference of the bottom plate 4a so that the outer circumference wall 4b surrounds an installation region of the magnetic recording disk 8. Six screw holes 22 are formed on the upper surface 4c of the outer circumference wall 4b.

The data read/write unit 10 includes: a read/write head (not shown); a swing arm 14; a voice coil motor 16; and a pivot assembly 18. The read/write head is attached to the tip of the swing arm 14. The read/write head records data onto and reads out data from the magnetic recording disk 8. The pivot assembly 18 swingably supports the swing arm 14 with respect to the base 4 around the head rotation axis S. The voice coil motor 16 swings the swing arm 14 around the head rotation axis S and moves the read/write head to the desired position on the upper surface of the magnetic recording disk 8. The voice coil motor 16 and the pivot assembly 18 are constructed using a known technique for controlling the position of the head.

FIG. 1B is a side view of the rotating device 1. The top cover 6 is fixed onto the upper surface 4c of the outer circumference wall 4b of the base 4 using six screws 20. The six screws 20 correspond to the six screw holes 22, respectively. In particular, the top cover 2 and the upper surface 4c of the outer circumference wall 4b are fixed together so that the joint portion between both does not create a leak into the inside of the rotating device 1. The inside of the rotating device 1, for example, is a clean space 24 surrounded by the bottom plate 4a of the base 4 and the outer circumference wall 4b of the base 4 and the top cover 2. This clean space 24 is designed so that the clean space 24 is sealed, in other words, there is neither leakage from the outside or on the inside. The clean space 24 is filled with clean air, with particles removed. This can suppress adhesion of contaminants, such as particles, onto the magnetic recording disk 8 and can increase the reliability of the rotating device 1.

Figure 2:
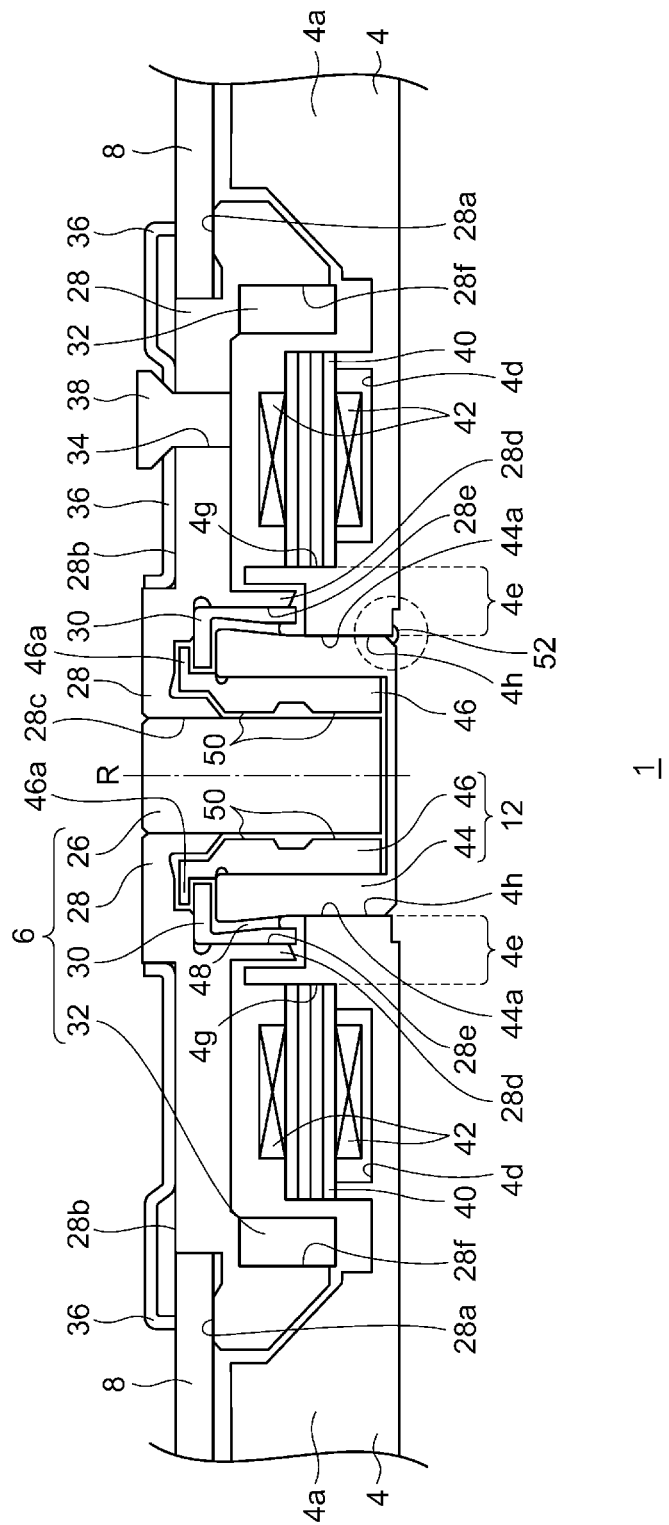
FIG. 2 is a section view sectioned along A-A line in FIG. 1A.

FIG. 2 is a view that is sectioned along the line A-A, as illustrated in FIG. 1A. The rotating device 1 further comprises a laminated core 40 and coils 42. The laminated core 40 has a ring portion and twelve teeth, which extend radially (i.e. in a direction perpendicular to the rotational axis R) outwardly from the ring portion, and is fixed on the upper surface 4d side of the base 4. The laminated core 40 is formed by laminating four thin magnetic steel sheets and mechanically integrating them. An insulation coating is applied onto the surface of the laminated core 40 by electrodeposition coating or powder coating. Each of the coils 42 is wound around one of the twelve teeth, respectively. A driving flux is generated along the teeth by applying a three-phase sinusoidal driving current through the coils 42. A ring-shaped wall 4e, the center of which is along the rotational axis R of the rotor 6, is formed on the upper surface 4d of the base 4. The laminated core 40 is fitted to the outer surface 4g of the ring-shaped wall 4e with a press-fit or clearance fit and glued thereon.

The through hole 4h, the center of which is along the rotational axis R of the rotor 6, is formed on the base 4. The bearing unit 12 includes the housing 44 and the sleeve 46 and rotatably supports the rotor 6 with respect to the base 4. The housing 44 is glued in the through hole 4h of the base 4. The housing 44 is formed to be cup-shaped by integrating a cylindrical portion and a bottom portion as a single unit. The housing 44 is glued to the base 4 with the bottom portion downside.

The housing 44 is made of copper alloy and the outer surface 44a of the housing 44 is treated by nickel plating. Nickel coat is removed in at least a portion of a region of the outer surface 44a, the region being supposed to touch glue for gluing the housing 44 into the through hole 4h. In other words, the outer surface 44a of the housing 44, except for at least the portion of the region that touches the glue, has nickel layer. For example, after the whole outer surface 44a of the housing 44 is treated by nickel plating, nickel coat residing in a region where nickel coat is to be removed is removed by cutting. In this case, the bonding force of the glue at the place where nickel coat is removed can be increased.

The cylindrical sleeve 46 is glued on the inner side surface of the housing 44. A jetty portion 46a, which radially outwardly juts out, is formed at the upper end of the sleeve 46. This jetty portion 46a, in cooperation with the flange 30, limits the motion of the rotor 6 in the direction along the rotational axis R (hereinafter referred to as "axial direction").

The sleeve 46 accommodates the shaft 26. The lubricant 48 is injected into a region in between part of the rotor (the shaft 26, the flange 30, and the hub 28) and the bearing unit 12.

A pair of herringbone-shaped radial dynamic pressure grooves 50, which are vertically separated from each other, are formed on the inner surface of the sleeve 46. A first herringbone-shaped thrust dynamic pressure groove (not shown) is formed on the lower surface of the flange 30 that faces the upper surface of the housing 44. A second herringbone-shaped thrust dynamic pressure groove (not shown) is formed on the upper surface of the flange 30 that faces the lower surface of the jetty portion 46a. The rotor 6 is axially and radially supported by the dynamic pressure generated in the lubricant 48 by these dynamic pressure grooves when the rotor 6 rotates.

The pair of herringbone-shaped radial dynamic pressure grooves may be formed on the shaft 26. The first thrust dynamic pressure groove can be formed on the upper surface of the housing 44, and the second thrust dynamic pressure groove may be formed on the lower surface of the jetty portion 46a.

The rotor 6 includes: the shaft 26; the hub 28; the flange 30; and a cylindrical magnet 32. The magnetic recording disk 8 is mounted on a disk-mount surface 28a of the hub 28. Three screw holes 34 for affixing a disk are arranged on the upper surface 28b of the hub 28 at 120-degree intervals around the rotational axis R of the rotor 6. The clamper 36 is pressed against the upper surface 28b of the hub 28 by three screws 38 for affixing a disk, which are screwed in the corresponding three screw holes 34 for affixing a disk. The clamper 36 presses the magnetic recording disk 8 against the disk-mount surface 28a of the hub 28.

The hub 28 is made of soft-magnetic steel such as SUS430F. The hub 28 is formed to be predetermined cup-like shape by, for example, the press working or cutting of a steel plate. For example, the hub 28 may preferably be made of the stainless steel (DHS1) provided by Daido Steel Co., Ltd. since the stainless steel has lower outgas and is easily-worked. The hub 28 may more preferably be made of the stainless steel (DHS2) provided by Daido Steel Co., Ltd. since the stainless steel has high corrosion resistance.

The shaft 26 is fixed in the hole 28c arranged at the center of the hub 28 by using both press-fitting and glue, the hole 28c being arranged coaxially with the rotational axis R of the rotor 6. The flange 30 is in ring-shape and has a reverse L-shaped cross section. The flange 30 is glued on an inner surface 28e of a hanging portion 28d of the hub 28.

The cylindrical magnet 32 is glued on a cylindrical inner surface 28f that is an inner cylindrical surface of the cup-like hub 28. The cylindrical magnet 32 is made of a rare-earth material such as Neodymium, Iron, or Boron. The cylindrical magnet 32 faces radially towards twelve teeth of the laminated core 40. The cylindrical magnet 32 is magnetized for driving, with sixteen poles along the circumferential direction (i.e. in a tangential direction of a circle the center of which is in the rotational axis R, the circle being perpendicular to the rotational axis R). The surface of the cylindrical magnet 32 is treated for preventing rusting by electro deposition coating or spray coating.

Around the lower edge of the through hole 4h, a thermosetting conductive resin 52 is applied so that the resin is over the base 4 and the housing 44. The conductive resin 52 does not include epoxy resin as a main ingredient. For example, conductive resin having conductive material (such as metal) as a main ingredient may be used. In particular, conductive resin more than 80 percent of which is other than epoxy resin may be used. This may suppress deterioration of appearance of a coating region of the base 4, the deterioration being possibly caused by migration of epoxy resin.

Various materials such as silver paste can be used as the conductive material. For example, nickel paste is preferred since the change in conductivity with respect to time is relatively small and it is relatively inexpensive. Various materials can be used as the conductive resin that does not include epoxy resin as a main ingredient. For example, a resin (product number 3317) provided by ThreeBond Co., Ltd. is one-component conductive resin that has nickel paste as a main ingredient and that does not include epoxy resin. This resin is advantageous in mechanization of resin-application work since it does not require mixing two components.

The First Embodiment

Figure 3:
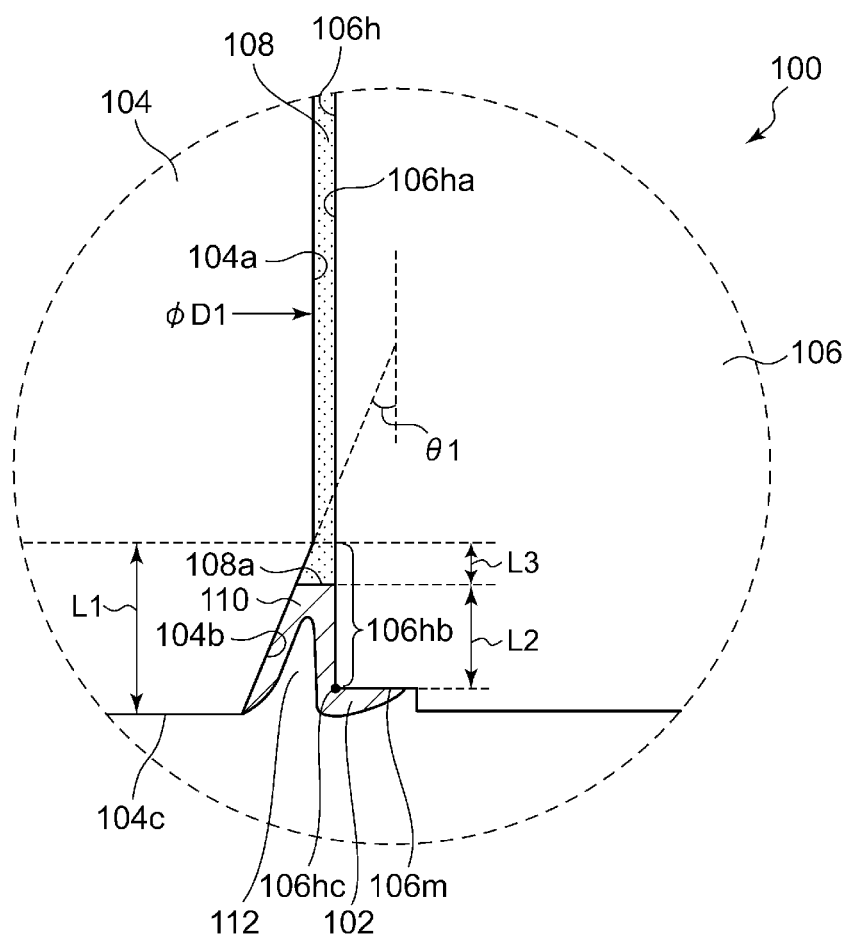
FIG. 3 is an enlarged section view enlarging a portion of a section of the rotating device according to a first embodiment where conductive resin is applied.

FIG. 3 is an enlarged section view enlarging a portion of a section of the rotating device 100 according to the first embodiment where conductive resin 102 is applied. FIG. 3 corresponds to a region enclosed by a dashed-line circle in FIG. 2.

A housing 104, which is included in a bearing unit of the rotating device 100, comprises: a cylindrical outer surface 104a facing an inner surface 106ha of a through hole 106h of a base 106; and a guiding surface 104b the diameter of which is less than a diameter D1 of the outer surface 104a, the guiding surface 104b being arranged on the underside of the outer surface 104a.

The guiding surface 104b is shaped so that the diameter of the guiding surface 104b continuously decreases from the lower end of the outer surface 104a to a bottom surface 104c of the housing 104. In particular, the guiding surface 104b forms a part of a conical surface. The guiding surface 104b is formed so that the angle θ1 between the guiding surface 104b and the rotational axis R ranges from 10 degrees to 45 degrees. This can ease the fabrication. The guiding surface 104*b* is formed so that the length L1 taken in the axial direction ranges from 0.5 mm to 2 mm.

Glue 108, which seamlessly intervenes between the housing 104 and the through hole 106*h*, has an interface 108*a* in an end space 110, the end space 110 being sandwiched between the guiding surface 104*b* and the inner surface 106*ha* of the through hole 106*h*. The end space 110 is a ring-shaped space. The center of the ring coincides with the rotational axis R. The cross section of the end space 110 substantially is a trapezoid. In at least a part of the remainder of the end space 110 (i.e. a portion other than the portion which is filled with the glue 108), conductive resin 102 is seamlessly applied from the guiding surface 104*b* to the inner surface 106*ha* of the through hole 106*h*.

With regard to a facing inner surface 106*hb* of the inner surface 106*ha* of the through hole 106*h* that radially faces the guiding surface 104*b*, the length L2, in the axial direction, of a part of the facing inner surface 106*hb* that touches the conductive resin 102 is greater than the length L3, in the axial direction, of a part of the facing inner surface 106*hb* that touches the glue 108. In particular, with regard to the facing inner surface 106*hb*, the area of the part of the facing inner surface 106*hb* that touches the conductive resin 102 ranges from 5 mm$^2$ to 20 mm$^2$.

The cutting portion 106*m* is arranged on the base 106. The cutting portion 106*m* results from radially outwardly cutting the base 106 from a periphery edge 106*hc* located at the underside of the through hole 106*h*. The conductive resin 102 is applied along each of the guiding surface 104*b*, the interface 108*a*, the inner surface 106*ha* and the surface of the cutting portion 106*m*. A concave portion 112 is arranged on a lower end surface of the conductive resin 102. Compared with the case where such a concave portion 112 is not arranged, having such a concave portion 112 allows one to reduce the amount of the conductive resin 102 applied, the amount equivalent to the volume of the concave portion 112. This may reduce the total weight of the rotating device 100 and may reduce the amount of conductive resin 102 required for manufacturing each rotating device 100; thereby reducing the cost.

Figure 4:
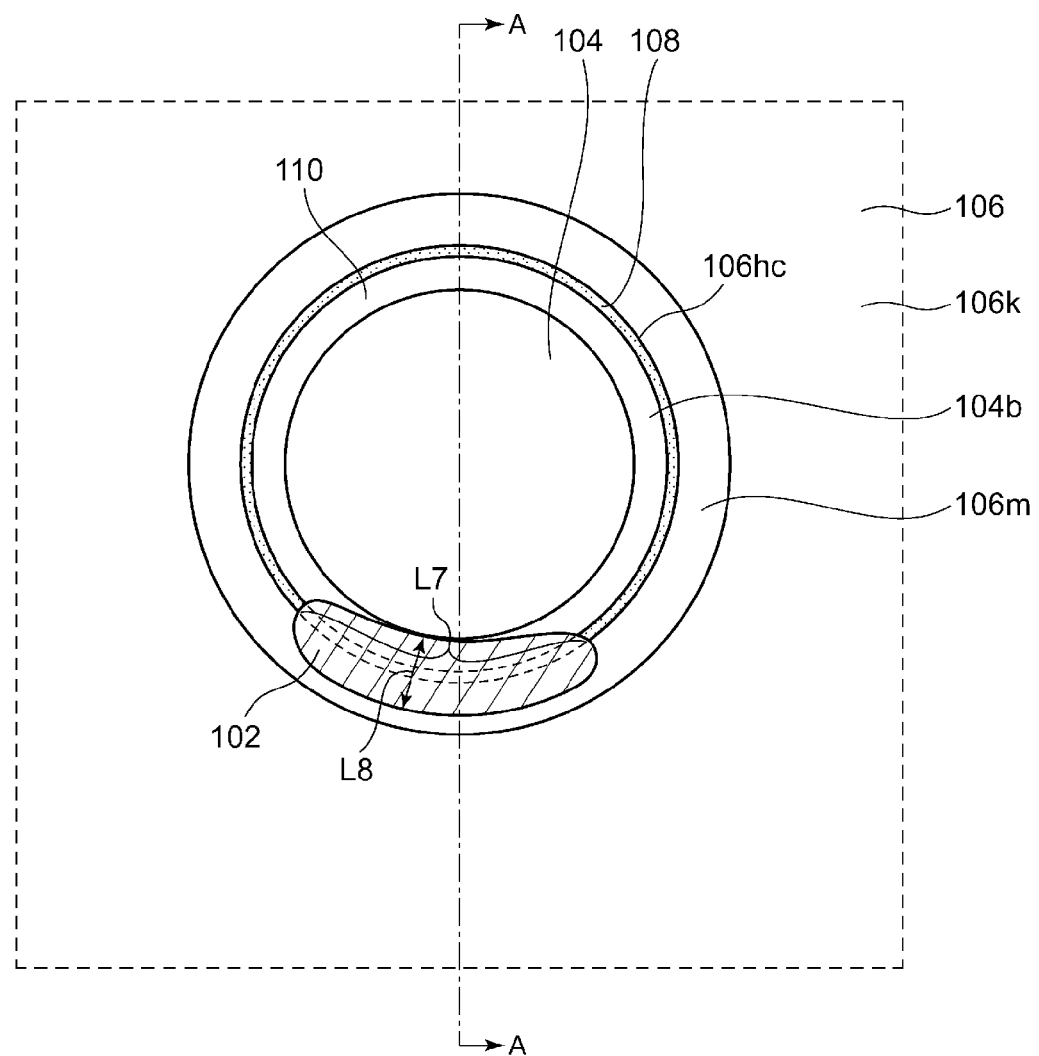
FIG. 4 is an enlarged section view enlarging a portion of a bottom surface of a base, the portion being around an periphery edge of a through hole.

FIG. 4 is an enlarged section view enlarging a portion of the bottom surface 106*k* of the base 106, the portion being around the periphery edge 106*hc* of the through hole 106*h*. The A-A line in FIG. 4 corresponds to the cross section of FIG. 2. The conductive resin 102 occupies a part of the end space 110 and in particular is applied so that it covers a portion, with predetermined length L7, of the periphery edge 106*hc* of the through hole 106*h*. That is, the length, in the circumferential direction, of the conductive resin 102 is L7.

The conductive resin 102 is applied so that the length L7, in the circumferential direction, of the conductive resin 102 is more than 1.5 times the width L8, in the radial direction, of the conductive resin 102. This may improve the impact resistance of the conductive resin 102 itself or the impact resistance of the electrical conduction between the conductive resin 102 and the housing 104/the base 106.

Figure 5:
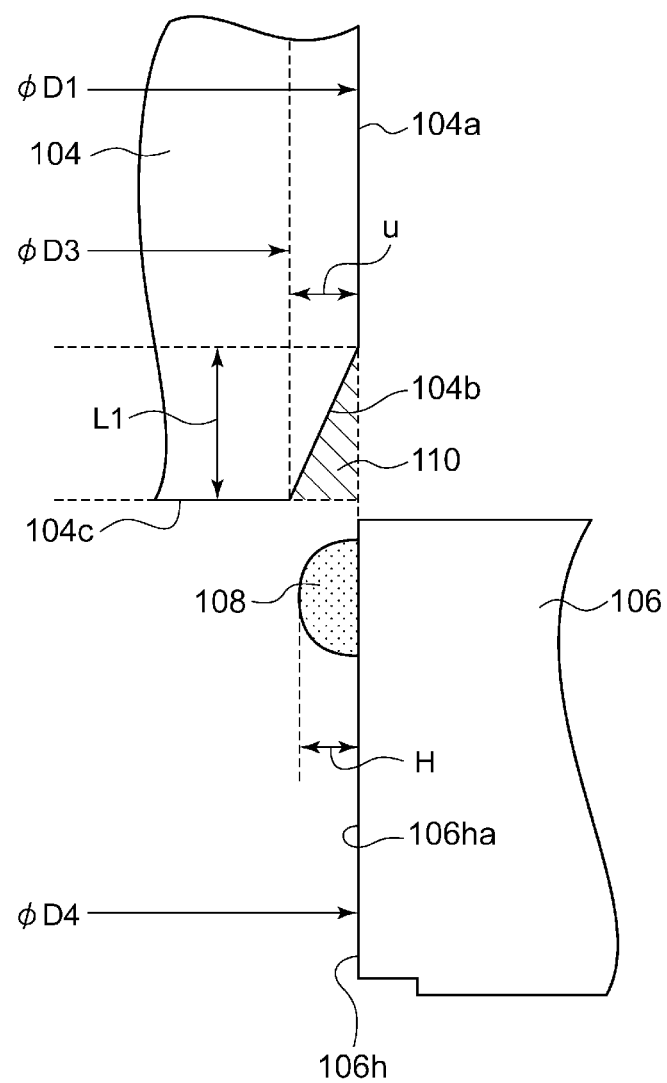
FIG. 5 is, with respect to the rotating device according to the first embodiment, a partial section view showing a situation before inserting a housing into the through hole of the base from a guiding surface side.

The relationship between the volume V1 of the end space 110 and the volume V2 of the glue 108 will be described below. FIG. 5 is, with respect to the rotating device 100 according to the first embodiment, a partial section view showing a situation before inserting the housing 104 into the through hole 106*h* of the base 106 from the guiding surface 104*b* side. The glue 108 is applied all the way along the upper part of the inner surface 106*ha* of the through hole 106*h* and the housing 104 is inserted into the through hole 106*h* from above.

The length L1, in the axial direction, of the guiding surface 104*b* is greater than the difference in radius, the difference being a half of a difference between the diameter D4 of the inner surface 106*ha* of the through hole 106*h* and the minimum diameter D3 of the guiding surface 104*b* (i.e. the diameter of the lower periphery edge of the guiding surface 104*b*). The volume V1 of the end space 110 ranges from 66 percent to 200 percent of the volume V2 of the glue 108.

According to the rotating device 100 according to the present embodiment, the guiding surface 104*b* is tapered in order to form the end space 110 in which the glue 108 and the conductive resin 102 coexist. In the case where there is no glue 108 in the end space 110, the glue strength between the housing 104 and the base 106 may not be sufficient. In addition, if a certain portion of the gap between the outer surface 104*a* of the housing 104 and the inner surface 106*ha* of the through hole 106*h* is not filled with the glue 108, it is not favorable in terms of the glue strength. Therefore, the end space 110, after the housing 104 is inserted, has a certain amount of glue 108. In other words, an amount of glue 108 to be applied that is enough to fill up the gap between the outer surface 104*a* of the housing 104 and the inner surface 106*ha* of the through hole 106*h* and to spill over into the end space 110 to some extent is calculated according, for example, to dimensions in design of the rotating device 100. The calculated amount of glue 108 is actually applied. As a result, even if the volume of the gap or the amount of the glue actually applied deviates from the designed value, it is less likely that a portion of the gap is not filled with the glue 108.

If most of the end space 110 is occupied by the glue 108, the contact area between the conductive resin 102 and the housing 104/the base 106 may decrease and it may be difficult to ensure the electrical conduction between the housing 104 and the base 106. With regard to the facing inner surface 106*hb*, the length L2, in the axial direction, of the part of the facing inner surface 106*hb* that touches the conductive resin 102 is greater than the length L3, in the axial direction, of the part of the facing inner surface 106*hb* that touches the glue 108. As a result, it is possible to ensure the glue strength between the housing 104 and the base 106 to the extent corresponding to the amount of glue in the end space 110, while the contact area between the conductive resin 102 and the guiding surface 104*b* and the contact area between the conductive resin 102 and the inner surface 106*ha* are made relatively large. Therefore, even if impact is applied to the rotating device 100, it is less likely for the glued portion between the housing 104 and the base 106 to be damaged and it is less likely for the conductive resin 102 to be peeled off from the guiding surface 104*b* or the inner surface 106*ha*.

Since the conductive resin 102 touches a surface of the cutting portion 106*m* where bare metal is exposed, the electrical conduction between the conductive resin 102 and the base 106 can be strengthened. Furthermore, in the cutting portion 106*m*, the height, in the axial direction, of the applied conductive resin 102 may be made less than the cutting depth. In this case, it is less likely for the conductive resin 102 after having been applied to touch and contaminate manufacturing facilities.

With regard to the length L1, in the axial direction, of the guiding surface 104*b*, if the length L1 is too small, the rotating device 100 may not be able to maintain the contact between the conductive resin 102 and the housing 104 when the rotating device 100 receives a predetermined test impact acceleration. To cope with this, in the rotating device 100 according to the present embodiment, the length L1, in the axial direction, of the guiding surface 104*b* is made greater than or equal to 0.5 mm thereby maintaining the impact resistance of the contact between the conductive resin 102 and the housing 104.

If the length L1, in the axial direction, of the guiding surface 104b is too large, the rotating device 100 may become thicker by that length L1. To cope with this, in the rotating device 100 according to the present embodiment, the length L1, in the axial direction, of the guiding surface 104b is made less than or equal to 2 mm thereby suppressing the increase of thickness of the rotating device 100.

In particular, it is preferred for the length L1, in the axial direction, of the guiding surface 104b to range from 0.7 mm to 1.5 mm, since both the suppression of the size of the rotating device and the maintenance of the impact resistance of the electrical conduction through the conductive resin 102 can be realized.

With regard to the area of the portion, in contact with the conductive resin 102, of the facing inner surface 106hb, if the area is too small, the rotating device 100 may not be able to maintain the contact between the conductive resin 102 and the base 106 when the rotating device 100 receives a predetermined test impact acceleration. To cope with this, in the rotating device 100 according to the present embodiment, the area of the portion, in contact with the conductive resin 102, of the facing inner surface 106hb is made greater than or equal to 5 mm² thereby maintaining the impact resistance of the contact between the conductive resin 102 and the base 106.

If the area of the portion, in contact with the conductive resin 102, of the facing inner surface 106hb, is too large, the rotating device 100 may become thicker by an amount corresponding to that area. To cope with this, in the rotating device 100 according to the present embodiment, the area of the portion, in contact with the conductive resin 102, of the facing inner surface 106hb is made less than or equal to 20 mm² thereby suppressing the increase of thickness of the rotating device 100.

In particular, it is preferred for the area of the portion, in contact with the conductive resin 102, of the facing inner surface 106hb to range from 7 mm² to 13 mm², since both the suppression of the size of the rotating device and the maintenance of the impact resistance of the electrical conduction through the conductive resin 102 can be realized.

In the rotating device 100 according to the present embodiment, the cutting portion 106m is provided around the periphery edge 106hc located on the underside of the through hole 106h, and the conductive resin 102 is applied to this cutting portion 106m. Therefore, the conductive resin 102 can be made thick to the extent equivalent to the cutting depth of the cutting portion 106m. As a result, even if impact is applied to the rotating device 100, it is less likely for the conductive resin 102 to crack.

In the case where the volume V1 of the end space 110 is relatively large, when the housing 104 is inserted into the through hole 106h, most of the glue 108 applied to the inner surface 106ha of the through hole 106h is captured by the end space 110 and touch the guiding surface 104b. The guiding surface 104b moves relative to the base 106 and the guiding surface 104b acts to push the glue 108 towards the inner surface 106ha of the through hole 106h. As a result, the glue 108 more smoothly penetrates between the base 106 and the housing 104.

Since the guiding surface 104b is tapered so that the diameter of it progressively decreases in the downward direction, the force to axially downwardly push the whole glue 108 out when the housing 104 is being inserted is small compared with the case where the guiding surface 104b is not provided. Therefore, the possibility that axial disjunction of the glue 108 is created due to tearing of the glue 108 may be reduced. That is, when the housing 104 is being inserted, more glue 108 is collected in the end space 110, and a portion of the glue 108 that is pushed away onto the bottom surface 104c of the housing 104 does not exist or is little.

If the volume V1 of the end space 110 is far less than the volume V2 of the glue 108, the glue 108 may spill out of the end space 110 and the fraction of the glue 108 that is pushed away onto the bottom surface 104c of the housing 104 may increase. In the case where the volume V1 of the end space 110 is greater than or equal to 66 percent of the volume V2 of the glue 108, the glue 108 in principle may be accommodated in the end space 110 during the insertion of the housing 104.

If the volume V1 of the end space 110 is far less than the volume V2 of the glue 108, the fraction of the glue 108 that is pushed against the inner surface 106ha of the through hole 106h by the guiding surface 104b becomes relatively small. This may cause disjunction of the glue 108 that penetrates between the housing 104 and the base 106. In the case where the volume V1 of the end space 110 is greater than or equal to two-thirds (i.e. 66 percent) of the volume V2 of the glue 108, the disjunction of the glue 108 may be less likely to happen.

If the volume V1 of the end space 110 is far greater than the volume V2 of the glue 108, the length L1, in the axial direction, of the guiding surface 104b may become relatively large. This may require making the rotating device larger accordingly. Alternatively, if the length L1 is made larger while the size of the rotating device is maintained, the length, in the axial direction, of the bearing unit may be made smaller accordingly. This may reduce the stiffness of the bearing and the rotation accuracy of the hub. In the case where the volume V1 of the end space 110 is less than or equal to two times (i.e. 200 percent) of the volume V2 of the glue 108, such effects may not be significant.

The condition on the difference u in radius in order for most of the glue 108 to touch the guiding surface 104b when the housing 104 is inserted will be described below.

The cross section of the glue 108 which is applied all the way along the upper part of the inner surface 106ha of the through hole 106h before the housing 104 is inserted is approximated to be a semi-ellipse with (the length of the major axis)/(the length of the minor axis)=2. When the length of the minor axis of this semi-ellipse is denoted as 2H and when it is assumed that the diameter D4 of the inner surface 106ha of the through hole 106h is sufficiently greater than the length 2H of the minor axis, the volume V2 of the glue 108 is expressed with the following equation 1.

$$V2 \approx \tfrac{1}{2}\pi H^2 \times \pi \cdot D4 \qquad \text{(Equation 1)}$$

According to the equation 1, the half H of the length 2H of the minor axis is expressed with the following equation 2.

$$H \approx \frac{1}{\pi}\sqrt{\frac{V2}{D4}} \qquad \text{(Equation 2)}$$

In order for most of the glue 108 to touch the guiding surface 104b when the housing 104 is inserted, the half H of the length 2H of the minor axis (the radial width of the glue 108 before the housing 104 is inserted) may be less than or equal to the difference u in radius. This condition is expressed with the following equation 3.

$$u \geq \frac{1}{\pi}\sqrt{\frac{V2}{D4}} \qquad \text{(Equation 3)}$$

The Second Embodiment

Figure 6:
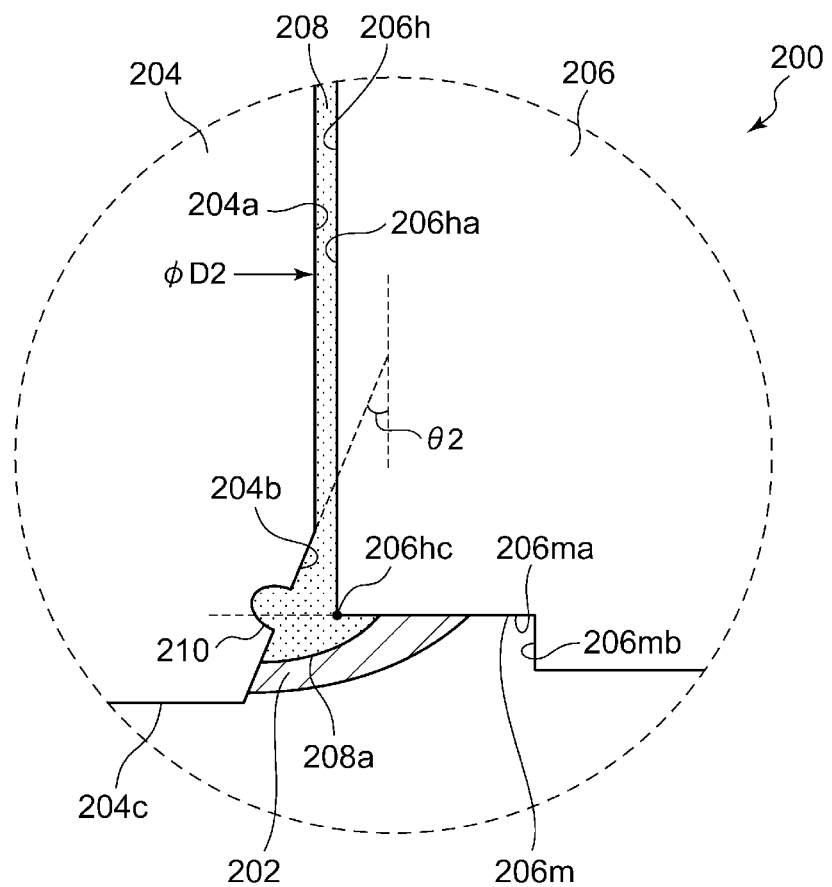
FIG. 6 is an enlarged section view enlarging a portion of a section of the rotating device according to a second embodiment where conductive resin is applied.

FIG. 6 is an enlarged section view enlarging a portion of a section of a rotating device 200 according to the second embodiment where conductive resin 202 is applied. FIG. 6 corresponds to the region enclosed by a dashed-line circle in FIG. 2.

A housing 204, which is included in a bearing unit of the rotating device 200, comprises: a cylindrical outer surface 204a facing an inner surface 206ha of a through hole 206h of a base 206; and a guiding surface 204b the diameter of which is less than a diameter D2 of the outer surface 204a, the guiding surface 204b being arranged on the underside of the outer surface 204a.

The guiding surface 204b is shaped so that the diameter of the guiding surface 204b continuously decreases from the lower end of the outer surface 204a to a bottom surface 204c of the housing 204 except for the after-mentioned ring-like concave portion 210. The guiding surface 204b is formed so that the angle θ2 between the guiding surface 204b and the rotational axis R ranges from 10 degrees to 45 degrees. This can ease the fabrication.

The ring-like concave portion 210 is arranged at certain axial position on the guiding surface 204b, the center the ring-like concave portion 210 being along the rotational axis R. At least a part of the ring-like concave portion 210 (the whole ring-like concave portion in the present embodiment) is filled with glue 208 which seamlessly intervenes between the housing 204 and the through hole 206h.

The cutting portion 206m is arranged on the base 206. The cutting portion 206m results from radially outwardly cutting the base 206 from the periphery edge 206hc located at the underside of the through hole 206h. The cutting portion 206m comprises: a cutting surface 206ma substantially perpendicular to the rotational axis R, the cutting surface 206ma having a shape like a disk with the center on the rotational axis R; and a cylindrical side surface 206mb. The glue 208 is applied so that the glue 208 covers at least a part of the cutting surface 206ma. That is, the glue 208 expands radially outward beyond the periphery edge 206hc located at the underside of the inner surface 206ha of the through hole 206h.

The conductive resin 202 is seamlessly applied from the cutting surface 206ma, which is a part of the lower surface of the base 206, to the guiding surface 204b In particular, the conductive resin 202 is applied along each of the guiding surface 204b, the interface 208a of the glue 208, the cutting surface 206ma. As is the case with the rotating device 100 according to the first embodiment, when viewed from the bottom of the rotating device 200, the conductive resin 200 is applied so that it covers a portion, with predetermined length, of the periphery edge 206hc of the through hole 206h.

The ring-like concave portion 210 and the cutting portion 206m are formed so that the periphery edge 206hc located at the underside of the inner surface 206ha of the through hole 206h radially faces the ring-like concave portion 210. In particular, the ring-like concave portion 210 axially is aligned with the periphery edge 206hc located at the underside of the inner surface 206ha of the through hole 206h.

In the rotating device 200 according to the present embodiment, the glue 208 occupies at least a part of the ring-like concave portion 210 while the glue 208 expands radially outward beyond the periphery edge 206hc located at the underside of the inner surface 206ha of the through hole 206h. Since the glue 208 enters in the ring-like concave portion 210, even if impact is applied to the rotating device 200, a portion of the glue 208 which resides in the ring-like concave portion 210 receives a axial force from the ring-like concave portion 210 and the axial force may suppress downward protrusion of the glue 208. In addition, since the glue 208 covers the periphery edge 206hc, the conductive resin 202 may not touch the periphery edge 206hc which is a cornered portion. These may disperse stress applied to the conductive resin 202 and reduce the possibility that the conductive resin 202 cracks due to the impact.

If the ring-like concave portion is arranged at a position under the periphery edge 206hc, in order to introduce glue into at least a part of the ring-like concave portion, the interface of the glue gets close to the bottom surface 204c of the housing 204. In this case, it may be difficult to apply the conductive resin so that the conductive resin does not spill over from the lower surface of the base 206.

If the ring-like concave portion is arranged at a position above the periphery edge 206hc, in order to make glue touch the cutting surface 206ma, the axial distance between the interface of the glue and the ring-like concave portion may be relatively large. In this case, the effect of suppressing the protrusion of the glue by the ring-like concave portion may be relatively small.

Therefore, in the rotating device 200 according to the present embodiment, the periphery edge 206hc located at the underside of the inner surface 206ha of the through hole 206h radially faces the ring-like concave portion 210. This allows to apply a desired amount of conductive resin 202 so that the conductive resin 202 does not spill over form the lower surface of the base 206 and to obtain a desired effect of suppressing the protrusion of the glue 208.

The shape of the ring-like concave portion 210 may be determined by experiments, so that electrical resistance between the housing 204 and the base 206 is kept lower than a predetermined value when a predetermined test impact acceleration is applied to the rotating device. For example, according to experiments performed by the present inventors, the opening of the ring-like concave portion 210 ranged from 0.1 mm to 0.3 mm. The depth of the ring-like concave portion 210 ranged from 0.1 mm to 0.3 mm. When a predetermined test impact acceleration is applied to the rotating device, the conductive resin did not crack.

Figure 7:
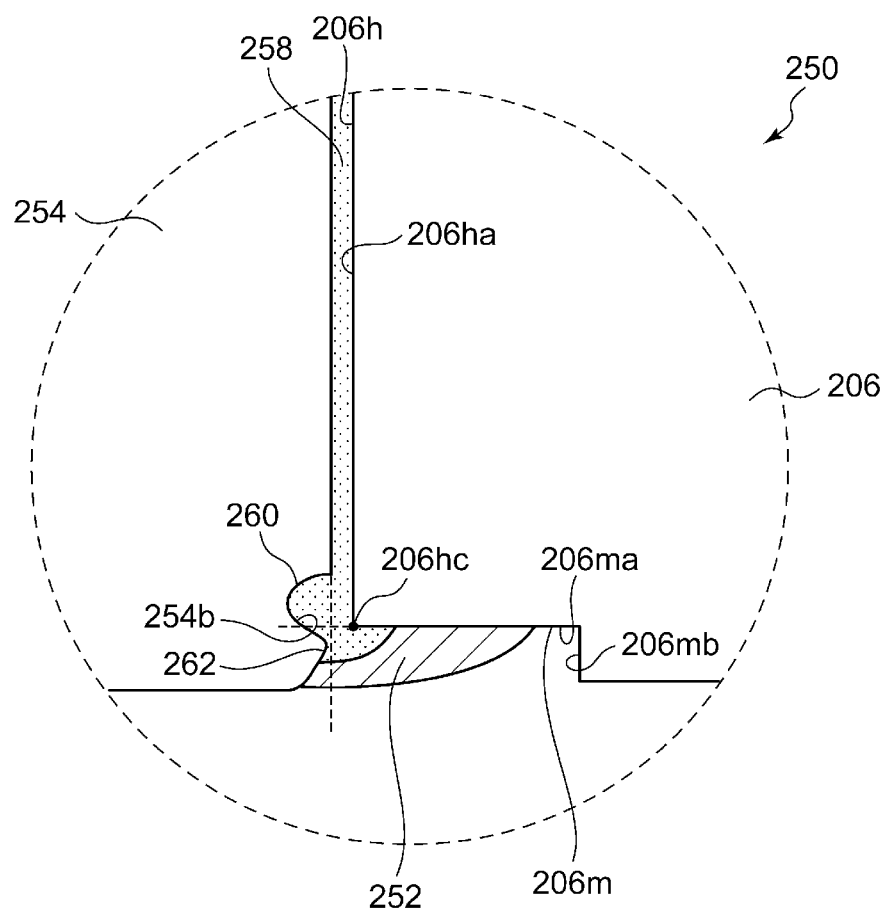
FIG. 7 is an enlarged section view enlarging a portion of a section of the rotating device according to a modification where conductive resin is applied.

FIG. 7 is an enlarged section view enlarging a portion of a section of a rotating device 250 according to a modification to the second embodiment where conductive resin 252 is applied. FIG. 7 corresponds to the region enclosed by a dashed-line circle in FIG. 2.

The guiding surface 254b of the housing 254 comprises: a ring-like concave portion 260 the center of which being on the rotational axis R; and a ring-like convex portion 262 the center of which is on the rotational axis R and located at the underside of the ring-like concave portion 260. The ring-like convex portion 262 screens the ring-like concave portion 260 as a visor. The ring-like concave portion 260 and the ring-like convex portion 262 are formed so that electrical resistance between the housing 254 and the base 206 is kept lower than a predetermined value when a predetermined test impact acceleration is applied to the rotating device.

The whole ring-like concave portion 260 is filled with glue 258 which seamlessly intervenes between the housing 254 and the through hole 206h. The glue 258 covers a part of the ring-like convex portion 262. The glue 258 expands radially outward beyond the periphery edge 206hc located at the underside of the inner surface 206ha of the through hole 206h.

The conductive resin 252 is seamlessly applied from the cutting surface 206ma to the guiding surface 254b.

The ring-like concave portion 260 and the cutting portion 206m are formed so that the periphery edge 206hc located at the underside of the inner surface 206ha of the through hole 206h radially faces the ring-like concave portion 260.

According to the present modification, the following advantage is obtained in addition to the advantages obtained by the rotating device 200 according to the second embodiment.

In the rotating device 250 according to the present modification, an axial force is exerted on the glue 258 from both the ring-like concave portion 260 and the ring-like convex portion 262 and the axial force may suppress downward protrusion of the glue 258. This may disperse stress applied to the conductive resin 252 and reduce the possibility that the conductive resin 252 cracks due to the impact.

Manufacturing Method

An exemplary method for manufacturing the rotating device 100 according to the first embodiment will be described below. It will be apparent to the skilled artisan who has read the present specification that the rotating device 200 according to the second embodiment or the rotating device 250 according to the modification thereof can be manufactured by the similar method.

In a step, a hub unit including the rotor 6, the sleeve 46 and the housing 104 is assembled. In another step, a base unit including the base 106, the laminated core 40 and the coils 42 is assembled.

FIG. 8A, FIG. 8B, FIG. 8C, FIG. 8D, FIG. 8E and FIG. 8F are partial section views showing how to mount the hub unit to the base unit.

FIG. 8A is a partial section view showing a situation before inserting the housing 104 into the through hole 106h of the base 106 from the guiding surface 104b side. FIG. 8A corresponds to FIG. 5. Prior to insertion of the housing 104, the glue 108 is applied, in a ring shape, to the upper part of the inner surface 106ha of the through hole 106h. The housing 104 is inserted into the through hole 106h with the guiding surface 104b being first inserted. FIG. 8B is a partial section view showing a situation where the glue 108 touches the guiding surface 104b. In this manufacturing method, when the housing 104 is inserted, the hub unit first touches the glue 108 on the guiding surface 104b.

Later, as shown in FIGS. 8C, 8D and 8E, the housing 104 is progressively inserted into the through hole 106h so that the glue 108 penetrates between the housing 104 and the base 106. The insertion is stopped at a predetermined position. During this insertion, the glue 108 is pushed against the inner surface 106ha of the through hole 106h by the guiding surface 104b and penetrates between the housing 104 and the base 106.

During this insertion and after the guiding surface 104b touches the glue 108, the housing 104 may be moved (i.e. rotated) in the circumferential direction relative to the base 106 while the contact between the guiding surface 104b and the glue 108 is maintained. Alternatively, during this insertion and after the guiding surface 104b touches the glue 108, the housing 104 may be axially reciprocated relative to the base 106 while the contact between the guiding surface 104b and the glue 108 is maintained. Alternatively, after the guiding surface 104b touches the glue 108, the housing 104 may be half-rotated while the contact between the guiding surface 104b and the glue 108 is maintained, and the half-rotated housing 104 may be inserted into the through hole 106h as it is and at the position. In these cases, the glue 108 is leveled to reduce the unevenness of the distribution of the glue 108 between the housing 104 and the base 106; thereby suppressing generation of disjunction of the glue 108.

Once the housing 104 is inserted to the predetermined position, the glue 108 is cured in a predetermined manner. As a result, the housing 104 temporarily is fixed to the base 106. The predetermined manner of curing is an extent where glue strength less than that obtained from curing conditions determined for the glue 108 is realized and for example an extent where the positional relationship between the housing 104 and the base 106 will not change due to gravity. In the case where the glue 108 is ultraviolet cure glue, a suitable amount of ultraviolet light is illuminated onto the glue 108 to temporarily fix the housing 104 to the base 106.

The interface of the glue 108 may be the interface 108a that substantially is perpendicular to the rotational axis R as shown in FIG. 3 or the interface 108b that is more or less skewed as shown in FIGS. 8E and 8F.

FIG. 8F is a partial section view showing the situation where the conductive resin 102 is applied. After the temporal fixing, the conductive resin 102 seamlessly is applied from the guiding surface 104b of the housing 104 to the cutting portion 106m of the base 106. Such applied conductive resin 102 is cured by thermal treatment. In the case where the glue 108 is thermal cure glue, the glue 108 may further be cured from the state of temporal curing in parallel with the thermal treatment of the conductive resin 102. An example of the thermal treatment is to put, in a high temperature environment, the hub unit and the base unit after the conductive resin 102 is applied followed by keeping them for a predetermined time.

After the conductive resin 102 is cured, whether there is a leak between the one side of the base 106 and the other side of the base 106 is inspected. In particular, whether there is a leak through the through hole 106h is inspected. In this inspection, a space that is defined by at least a one-side surface of the base 106 and that is sealed if there were not any leak from the surface is pressurized to pressure higher than atmospheric pressure, and a rate of decrease in pressure of the space is measured. This case is preferable since the leak inspection is performed within a flow of manufacture of the rotating device 100.

The amount of glue 108 that is applied to the inner surface 106ha of the through hole 106h before the housing 104 is inserted into the through hole 106h is determined so that, during insertion, the hub unit first touches the glue 108 on the guiding surface 104b. In particular, when viewed in a cross section including the rotational axis R, the height, in the radial direction, of the glue 108 before insertion of the housing 104 has its maximum value. The average value h of maximum values averaged over the circumferential direction satisfies the following equation 4.

$$\frac{u}{2} \leq h \leq \frac{3u}{2} \quad \text{(Equation 4)}$$

FIG. 9A, FIG. 9B, FIG. 9C, FIG. 9D, FIG. 9E and FIG. 9F are partial section views showing how to mount a hub unit of the rotating device according to related art to a base unit of the rotating device according to related art. FIG. 9A is a partial section view showing a situation before inserting the housing 504 into the through hole 506h of the base 506. The glue 508 is applied, in a ring shape, to the inner surface of the through hole 506h. The housing 504 is inserted into the through hole 506h from the above (FIG. 9B). The housing 504 is further inserted towards the back of the through hole 506h. Here, a force to push the housing 504 is transmitted to the glue 508 as an axial downward force and does not cause a radial force toward the inner surface of the through hole 506h. That is, an axial downward force is exerted on the whole glue 508. An adhesion force (or a friction force) in order for the glue 508 to remain on the inner surface of the through hole 506h is exerted only to a portion of the glue 508 around the inner surface of the through hole 506h.

As a result, most of the applied glue 508 is pushed onto the bottom surface of the housing 504 and migrates to the lower surface side of the base 506. In this case, only a part of the applied glue 508 accompanies the inner surface of the through hole 506h due to its adhesion force and remains between the housing 504 and the base 506. Therefore, the fraction of such remaining glue is small (FIG. 9C). The housing 504 further is inserted towards the back of the through hole 506h. Here, the glue 508 is torn by an axial downward tension force and easily is segmentalized in the middle along the axial direction (FIG. 9D). The housing 504 is inserted to a predetermined position. Here, the glue 508 further is segmentalized along the axial direction (FIG. 9E). Such segmentation or disjunction of the glue 508 seldom occurs evenly in the circumferential direction. In many cases, such segmentation or disjunction of the glue 508 occurs randomly. Therefore, it is likely that, as a whole, there is disjunction of the glue 508 in the circumferential direction. After the glue 508 is cured, the conductive resin 502 is applied on top of it. The applied conductive resin 502 protrudes from the lower surface of the base 506 (FIG. 9F).

Figure 10A:
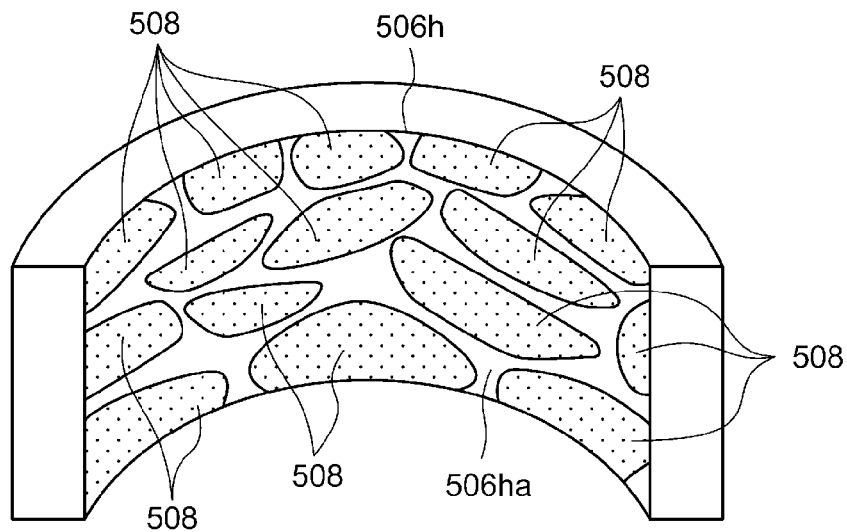
FIG. 10A and FIG. 10B are views for explaining how the glue is distributed between the housing and the base.
Figure 10B:
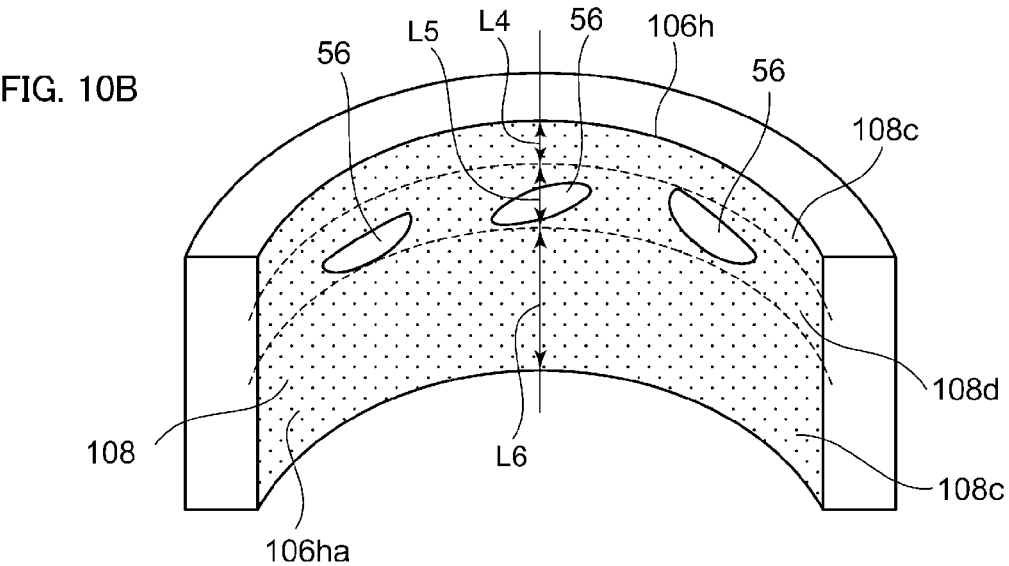

FIG. 10A and FIG. 10B are views for explaining how the glue is distributed between the housing and the base. FIG. 10A is a view for explaining how the glue 508 is distributed, the glue 508 adhering to the inner surface 506ha of the through hole 506h, with regard to a rotating device according to comparison example. The through hole 506h virtually is divided into two by a surface parallel to the rotational axis, and FIG. 10A corresponds to the situation where one of the two divided portions is viewed from obliquely upward direction. As can be seen in FIG. 10A, in the rotating device according to comparison example, the distribution of the glue 508 is uneven both in the axial direction and in the circumferential direction, and the glue 508 is segmentalized at many places. Therefore, the segmentalized portions may be connected together and may form a path of leak.

On the other hand, in the method for manufacturing the rotating device 100 according to the first embodiment, the guiding surface 104b pushes the glue 108 towards the inner surface 106ha of the through hole 106h during insertion of the housing 104. Therefore, disjunction of the glue 108 between the housing 104 and the base 106 is suppressed and a more leak-tight rotating device is realized. FIG. 10B is a view for explaining how the glue 108 is distributed, the glue 108 adhering to the inner surface 106ha of the through hole 106h, with regard to the rotating device 100 according to the first embodiment. The through hole 106h virtually is divided into two by a surface parallel to the rotational axis R, and FIG. 10B corresponds to the situation where one of the two divided portions is viewed from obliquely upward direction. The glue 108 is distributed evenly or uniformly on the inner surface 106ha of the through hole 106h. The portion 56 is a portion where the glue 108 does not exist.

In the rotating device 100, the glue 108 is divided into one or more seamless layers 108c and one or more non-seamless layers 108d, each of the seamless layers 108c being defined as a layer in which the glue 108 seamlessly exists all the way around the through hole 106h without any disjunction and each of the non-seamless layers 108d being defined as a layer in which the glue 108 does not exist all the way around the through hole 106h. The summation (L4+L6) of the respective lengths L4, L6, in the axial direction, of the one or more seamless layers 108c is greater than the summation (L5) of the respective length(s) L5, in the axial direction, of the one or more non-seamless layer(s) 108d. As a result, the leak is less likely to occur.

If the glue 108 adheres to the bottom surface 104c of the housing 104, the glue 108 may adhere to jigs or tools or facility in the manufacturing processes. Removing such glue requires great care and, if left unremoved, the appearance of the rotating device may be deteriorated. With regard to this point, in the present manufacturing method, the glue 108 does not adhere to the bottom surface 104c of the housing 104 or, if it adheres, the amount of glue 108 adhering to the bottom surface 104c is little, for example an amount less than the amount of glue 108 adhering to the guiding surface 104b. Therefore, it is less likely for the glue 108 to adhere to jigs or tools for manufacturing the rotating device 100 and the appearance can be kept in a better condition.

Glue may be applied to the inner surface 106ha of the through hole 106h at a plurality of places in the axial direction before the housing 104 is inserted into the through hole 106h. That is, the glue may be applied to the positions of the inner surface 106ha of the through hole 106h, the positions being axially separated from one another.

Above is an explanation of structure and operation of the rotating devices according to the embodiments and the method for manufacturing such devices. These embodiments are intended to be illustrative only, and it will be obvious to those skilled in the art that various modifications to constituting elements and processes could be developed and that such modifications are also within the scope of the present invention. Alternatively, combinations of the embodiments are possible.

For example, a ring-like concave portion similar to the ring-like concave portion 210 of the rotating device 200 according to the second embodiment may be arranged on the guiding surface 104b of the rotating device 100 according to the first embodiment.

The first and second embodiments describe the so-called outer-rotor type of the rotating device in which the cylindrical magnet 32 is located outside the laminated core 40. However, the present invention is not limited to this. For example, the technical aspects according to the first or the second embodiment may be applied to the so-called inner-rotor type of the rotating device in which the cylindrical magnet is located inside the laminated core.

The first and second embodiments describe the case where the bearing unit is fixed to the base, and the shaft rotates with respect to the bearing unit. However, the present invention is not limited to this. For example, the technical aspects according to the first or the second embodiment may be applied to a shaft-fixed type of the rotating device in which the shaft is fixed to the base, and the bearing unit and the hub rotate together with respect to the shaft. In this case, the technical aspects according to the first or the second embodiment may be applied when the shaft and the base are formed separately and the shaft is inserted into and glued at a hole arranged on the base.

The first and second embodiments describe the case where the bearing unit is directly mounted onto the base. However, the present invention is not limited to this. For example, a brushless motor comprising a rotor, a bearing unit, a laminated core, coils, and a base can separately be manufactured, and the manufactured brushless motor can be installed on a chassis.

The first and second embodiments describe the case where the laminated core is used. However, the present invention is not limited to this. The core does not have to be a laminated core.

The first embodiment describes the case where the guiding surface 104b is formed on the surface of the housing 104. However, the present invention is not limited to this. For example, a guiding surface is arranged on a component other than a housing. For example, a guiding member having a guiding surface as a side surface may be attached to a bottom surface of a housing via glue.

In the first or the second embodiment, the region where the conductive resin is applied may be covered by a sticker that displays manufacture information. In particular, this sticker may plug the through hole. This sticker may cover the region where the conductive resin is applied and the gluing portion between the through hole and the housing. In this case, it is possible to protect the conductive resin 102 and the gluing portion.

What is claimed is:

1. A rotating device, comprising:
a hub on which a recording disk is to be mounted;
a bearing unit rotatably supporting the hub; and
a base on which a through hole is arranged, the bearing unit being glued to the through hole,
wherein the bearing unit includes:
a cylindrical outer surface facing an inner surface of the through hole; and
a guiding surface arranged on one side of the outer surface opposite to the hub, the diameter of the guiding surface being less than the diameter of the outer surface,
wherein glue, which intervenes between the bearing unit and the through hole, has an interface in an end space, the end space being sandwiched between the guiding surface and the inner surface of the through hole,
wherein conductive resin seamlessly is applied from the base to the bearing unit,
wherein, in at least a part of the end space where the glue does not exist, the conductive resin seamlessly is applied from the guiding surface to the inner surface of the through hole, and
wherein, with regard to a portion of the inner surface of the through hole that radially faces the guiding surface, the length, in the axial direction, of a part of said portion that touches the conductive resin is greater than the length, in the axial direction, of a part of said portion that touches the glue.

2. The rotating device according to claim 1, wherein the guiding surface is formed so that the length, in the axial direction, of the guiding surface ranges from 0.5 mm to 2 mm.

3. The rotating device according to claim 1, wherein the area of the part of said portion that touches the conductive resin ranges from 5 mm$^2$ to 20 mm$^2$.

4. The rotating device according to claim 1, wherein a concave portion is arranged on an end surface of the conductive resin, opposite to the hub.

5. The rotating device according to claim 1, wherein the volume of the end space ranges from 66 percent to 200 percent of the volume of the glue.

6. The rotating device according to claim 5, wherein, when the volume of the glue is denoted as V and the radius of the inner surface of the through hole is denoted as R, the difference u between the radius of a periphery edge, opposite to the hub, of the guiding surface and the radius of the inner surface of the through hole satisfies the following:

$$u \geq \frac{1}{\pi}\sqrt{\frac{V}{2R}}.$$

7. The rotating device according to claim 1, wherein the guiding surface is formed so that the angle between the guiding surface and a rotational axis ranges from 10 degrees to 45 degrees.

8. The rotating device according to claim 1, wherein the glue between the outer surface and the inner surface of the through hole is divided into one or more seamless layers and one or more non-seamless layers, each of the seamless layers being defined as a layer in which the glue seamlessly exists all the way around the through hole and each of the non-seamless layers being defined as a layer in which the glue does not exist all the way around the through hole, and
wherein the summation of one or more respective lengths, in the axial direction, of the one or more seamless layers is greater than the summation of one or more respective lengths, in the axial direction, of the one or more non-seamless layers.

9. The rotating device according to claim 1, wherein the base is made of aluminum alloy, and the outer surface of the bearing unit has a layer of nickel plating, except for at least a part of a portion of the outer surface of the bearing unit that touches the glue.

10. A rotating device, comprising:
a hub on which a recording disk is to be mounted;
a bearing unit rotatably supporting the hub; and
a base on which a through hole is arranged, the bearing unit being glued to the through hole,
wherein the bearing unit includes:
a cylindrical outer surface facing an inner surface of the through hole; and
a guiding surface arranged on one side of the outer surface opposite to the hub, the diameter of the guiding surface being less than the diameter of the outer surface,
wherein a concave portion is arranged on the guiding surface,
wherein at least a part of the concave portion is filled with the glue, which intervenes between the bearing unit and the through hole, and the glue expands radially outward beyond a periphery edge, opposite to the hub, of the inner surface of the through hole,
wherein conductive resin seamlessly is applied from the base to the bearing unit, and
wherein the guiding surface has a convex portion that is arranged on one side of the concave portion opposite to the hub.

11. The rotating device according to claim 10, wherein the periphery edge, opposite to the hub, of the inner surface of the through hole radially faces the concave portion.

12. The rotating device according to claim 10, wherein the concave portion and the convex portion are formed so that electrical resistance between the bearing unit and the base is kept lower than a predetermined value when a predetermined test impact acceleration is applied to the rotating device.

13. The rotating device according to claim 10, wherein the base is made of aluminum alloy, and the outer surface of the bearing unit has a layer of nickel plating, except for at least a part of a portion of the outer surface of the bearing unit that touches the glue.

14. A rotating device, comprising:
a hub on which a recording disk is to be mounted;
a bearing unit rotatably supporting the hub; and
a base on which a through hole is arranged, the bearing unit being glued to the through hole,
wherein the bearing unit includes:
a cylindrical outer surface facing an inner surface of the through hole; and
a guiding surface arranged on one side of the outer surface opposite to the hub, the diameter of the guiding surface being less than the diameter of the outer surface,
wherein glue, which intervenes between the bearing unit and the through hole, has an interface in an end space, the end space being sandwiched between the guiding surface and the inner surface of the through hole,
wherein conductive resin seamlessly is applied from the base to the bearing unit,
wherein the glue between the outer surface and the inner surface of the through hole is divided into one or more seamless layers and one or more non-seamless layers, each of the seamless layers being defined as a layer in which the glue seamlessly exists all the way around the through hole and each of the non-seamless layers being defined as a layer in which the glue does not exist all the way around the through hole, and
wherein the summation of one or more respective lengths, in the axial direction, of the one or more seamless layers is greater than the summation of one or more respective lengths, in the axial direction, of the one or more non-seamless layers.

15. The rotating device according to claim 14, wherein the guiding surface is formed so that the length, in the axial direction, of the guiding surface ranges from 0.5 mm to 2 mm.

16. The rotating device according to claim 14, wherein the area of the part of said portion that touches the conductive resin ranges from 5 $mm^2$ to 20 $mm^2$.

17. The rotating device according to claim 14, wherein a concave portion is arranged on an end surface of the conductive resin, opposite to the hub.

18. The rotating device according to claim 14, wherein the volume of the end space ranges from 66 percent to 200 percent of the volume of the glue.

19. The rotating device according to claim 14, wherein the guiding surface is formed so that the angle between the guiding surface and a rotational axis ranges from 10 degrees to 45 degrees.

20. The rotating device according to claim 14, wherein the base is made of aluminum alloy, and the outer surface of the bearing unit has a layer of nickel plating, except for at least a part of a portion of the outer surface of the bearing unit that touches the glue.

* * * * *